(12) United States Patent
Mujtaba et al.

(10) Patent No.: US 8,793,000 B2
(45) Date of Patent: Jul. 29, 2014

(54) IDLE MODE RECEIVE ANTENNA DIVERSITY SYSTEM

(75) Inventors: Syed A. Mujtaba, Santa Clara, CA (US); Youngjae Kim, Cupertino, CA (US); Bharath Narasimha Rao, San Jose, CA (US); Kee-Bong Song, Santa Clara, CA (US); Xiaowen Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 323 days.

(21) Appl. No.: 13/099,081

(22) Filed: May 2, 2011

(65) Prior Publication Data
US 2012/0281553 A1  Nov. 8, 2012

(51) Int. Cl.
*G05B 15/00*  (2006.01)
(52) U.S. Cl.
USPC .............................................. 700/1
(58) Field of Classification Search
USPC ................................ 700/1, 28, 53
See application file for complete search history.

(56) References Cited

U.S. PATENT DOCUMENTS

| | | | |
|---|---|---|---|
| 5,239,306 A | 8/1993 | Siwiak et al. | |
| 6,009,307 A | 12/1999 | Granata et al. | |
| 7,616,158 B2 | 11/2009 | Mak et al. | |
| 7,701,410 B2 | 4/2010 | Li et al. | |
| 8,160,648 B2 * | 4/2012 | Ulupinar et al. | 455/562.1 |
| 8,212,727 B2 * | 7/2012 | Hsu | 343/702 |
| 2002/0034943 A1 * | 3/2002 | Pallonen | 455/424 |
| 2005/0095987 A1 * | 5/2005 | Lyons et al. | 455/67.13 |
| 2008/0160992 A1 | 7/2008 | Jalali | |
| 2009/0207093 A1 * | 8/2009 | Anreddy et al. | 343/876 |
| 2010/0054166 A1 | 3/2010 | Jung | |
| 2010/0093385 A1 * | 4/2010 | Kazmi et al. | 455/517 |
| 2010/0184397 A1 * | 7/2010 | Kadous et al. | 455/234.1 |
| 2010/0202327 A1 * | 8/2010 | Mushkin et al. | 370/280 |
| 2010/0210235 A1 * | 8/2010 | Ulupinar et al. | 455/278.1 |
| 2011/0019830 A1 * | 1/2011 | Leibman et al. | 381/60 |
| 2012/0057621 A1 * | 3/2012 | Hong et al. | 375/219 |
| 2013/0016632 A1 * | 1/2013 | Mujtaba et al. | 370/275 |

OTHER PUBLICATIONS

Heath et al. "Multirnode Antenna Selection for Spatial Multiplexing Systems With Linear Receivers", IEEE Transactions on Signal Processing, vol. 53, No. 8, 2005 pp. 3042-3056.
Syed A. Mujtaba et al., U.S. Appl. No. 13/098,947, filed May 2, 2011.

* cited by examiner

*Primary Examiner* — Fan Ng
(74) *Attorney, Agent, or Firm* — Treyz Law Group; G. Victor Treyz; David C. Kellogg

(57) ABSTRACT

Electronic devices may be provided that contain wireless communications circuitry. The wireless communications circuitry may include radio-frequency transceiver circuitry coupled to multiple antennas. An electronic device may alternate between a sleep mode and a wake mode. During wake mode, the electronic device may monitor a paging channel in a wireless network for incoming paging signals. The device may use either a single antenna mode or a multiple antenna mode such as a dual antenna mode in monitoring the paging channel. In the single antenna mode, a single active antenna is used to receive paging signals. In the dual antenna mode two antennas are simultaneously used to receive paging signals. The device may choose which antenna mode to use based on signal quality measurements and history information on successfully received paging signals.

14 Claims, 4 Drawing Sheets

IDLE MODE RECEIVE ANTENNA DIVERSITY SYSTEM

This relates generally to wireless communications circuitry, and more particularly, to electronic devices that have wireless communications circuitry with multiple antennas.

Electronic devices such as portable computers and cellular telephones are often provided with wireless communications capabilities. For example, electronic devices may use long-range wireless communications circuitry such as cellular telephone circuitry and WiMax (IEEE 802.16) circuitry. Electronic devices may also use short-range wireless communications circuitry such as WiFi® (IEEE 802.11) circuitry and Bluetooth® circuitry.

Antenna performance affects the ability of a user to take advantage of the wireless capabilities of an electronic device. If antenna performance is not satisfactory, calls may be dropped or data transfer rates may become undesirably low. To ensure that antenna performance meets design criteria, it may sometimes be desirable to provide an electronic device with multiple antennas. In some situations, control circuitry within a device may be able to switch between antennas to ensure that an optimum antenna is being used to handle call traffic.

To conserve battery power, devices such as cellular telephones often support low power operating modes. For example, some cellular telephones support an idle mode that allows the cellular telephone circuitry to consume reduced amounts of power. In idle mode, the cellular telephone wireless circuitry alternates between sleep and wake states. While operating in the sleep state, wireless circuitry is inactivated so that the cellular telephone consumes a reduced amount of power. The sleep state typically lasts for a sleep period of about 640 ms to 5.1 s. When the sleep period is over, the wireless circuitry wakes up from the sleep state. The duration of the wake period is typically 100 ms. During the wake period, the wireless circuitry listens for incoming cellular telephone calls by monitoring a paging channel.

If, upon awakening, the cellular telephone is out of service, the cellular telephone may initiate a system search process to search for an available wireless network. If the cellular telephone is in service, but does not receive any paging signals during the wake period, the cellular telephone may return to the sleep state. If the cellular telephone detects incoming paging signals during the wake period, the cellular telephone can proceed with call setup operations to set up a communications link with the network and receive an incoming telephone call.

In devices such as cellular telephones with multiple antennas, the use of a single antenna to monitor the paging channel during idle mode operations may leave a device vulnerable to disruptions in received signal quality. For example, if received signals are weak because the cellular telephone is at a large distance from the nearest cellular telephone base station, incoming paging signals and therefore incoming telephone calls may not be received.

It would therefore be desirable to be able to provide improved ways for electronic devices to monitor paging signals.

SUMMARY

Electronic devices may be provided that contain wireless communications circuitry. The wireless communications circuitry may include radio-frequency transceiver circuitry coupled to multiple antennas.

When awaiting wireless traffic such as incoming cellular telephone calls, an electronic device may alternate between a sleep state and a wake mode. During wake mode, the electronic device may monitor a paging channel in a wireless network for incoming paging signals. The device may use either a single antenna or multiple antennas to monitor the paging channel during each sleep-wake cycle. For example, if the device has first and second antennas, the device may alternate between operation in a single antenna mode in which either the first or second antenna is used in monitoring the paging channel and a dual antenna mode in which the first and second antennas are used simultaneously to monitor the paging channel. If suitable criteria are satisfied, the antenna mode that is used in monitoring the paging channel may be switched.

Antenna mode switching decisions may be based on signal quality measurements and information on the history of successful incoming pages. For example, the device may maintain use of the single antenna mode for subsequent wake period monitoring of the paging channel if received signal quality is satisfactory. If received signal quality falls below a threshold, if no recent successful pages have been received, or if signal reception is otherwise indicated to not be satisfactory, the device may switch from the single antenna mode to the dual antenna mode. To conserve power, the device may revert to single channel mode in receiving paging signals when signal quality measurements or other suitable criteria indicate that the dual antenna mode is not needed.

Further features of the invention, its nature and various advantages will be more apparent from the accompanying drawings and the following detailed description of the preferred embodiments.

DETAILED DESCRIPTION

Electronic devices may be provided with wireless communications circuitry. The wireless communications circuitry may be used to support wireless communications in multiple wireless communications bands. The wireless communications circuitry may include multiple antennas arranged to implement an antenna diversity system.

The antennas can include loop antennas, inverted-F antennas, strip antennas, planar inverted-F antennas, slot antennas, hybrid antennas that include antenna structures of more than one type, or other suitable antennas. Conductive structures for the antennas may be formed from conductive electronic device structures such as conductive housing structures (e.g., a ground plane and part of a peripheral conductive housing member or other housing structures), traces on substrates such as traces on plastic, glass, or ceramic substrates, traces on flexible printed circuit boards ("flex circuits"), traces on rigid printed circuit boards (e.g., fiberglass-filled epoxy boards), sections of patterned metal foil, wires, strips of conductor, other conductive structures, or conductive structures that are formed from a combination of these structures.

Figure 1:
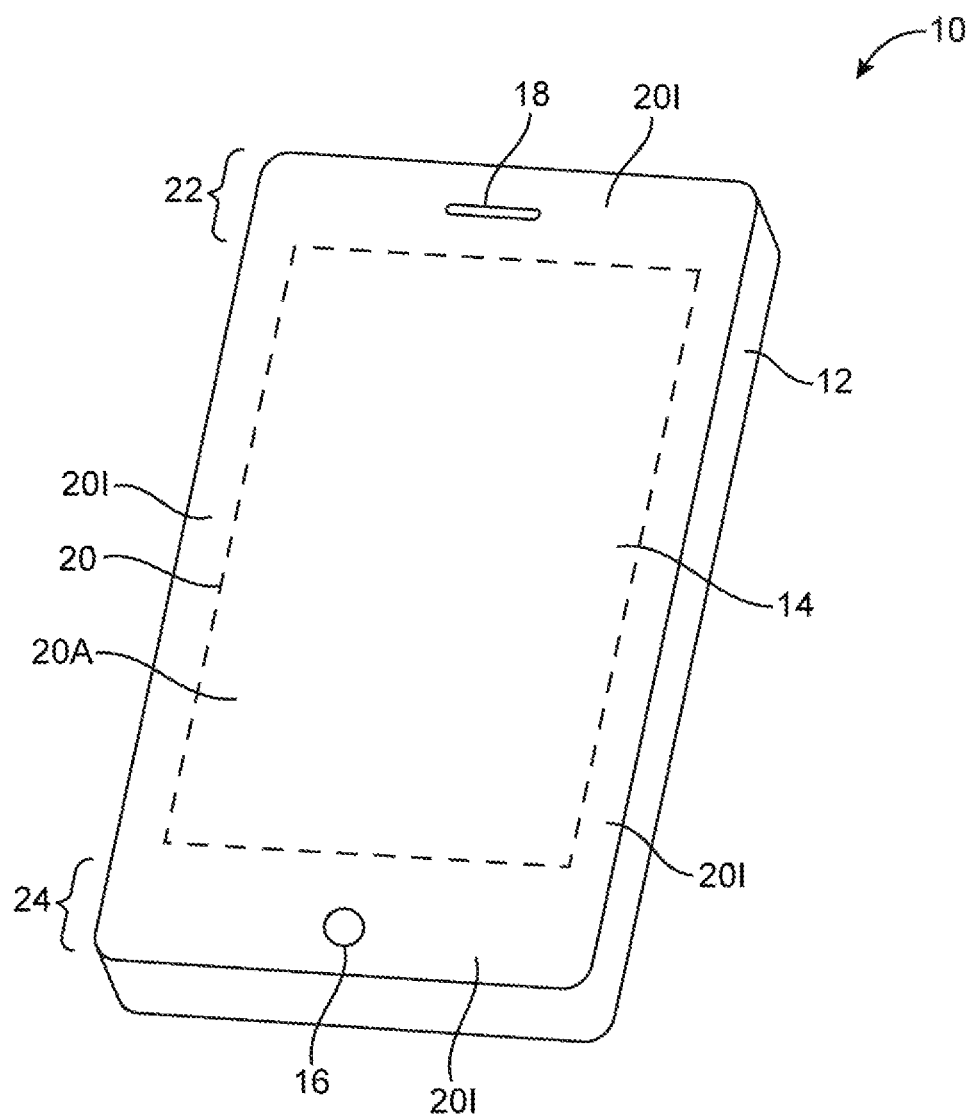
FIG. 1 is a perspective view of an illustrative electronic device with wireless communications circuitry having multiple antennas in accordance with an embodiment of the present invention.

An illustrative electronic device of the type that may be provided with one or more antennas (e.g., two antennas, three antennas, four antennas, five or more antennas, etc.) is shown in FIG. 1. Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, a media player, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed form light-emitting diodes (LEDs), organic LEDs (OLEDs), plasma cells, electronic ink elements, liquid crystal display (LCD) components, or other suitable image pixel structures. A cover glass layer may cover the surface of display 14. Portions of display 14 such as peripheral regions 201 may be inactive and may be devoid of image pixel structures. Portions of display 14 such as rectangular central portion 20A (bounded by dashed line 20) may correspond to the active part of display 14. In active display region 20A, an array of image pixels may be used to display images for a user.

The cover glass layer that covers display 14 may have openings such as a circular opening for button 16 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

Housing 12 may include a peripheral conductive member such as a bezel or band of metal that runs around the rectangular outline of display 14 and device 10 (as an example). The peripheral conductive member may be used in forming the antennas of device 10 if desired.

Antennas may be located along the edges of device 10, on the rear or front of device 10, as extending elements or attachable structures, or elsewhere in device 10. With one suitable arrangement, which is sometimes described herein as an example, device 10 may be provided with one or more antennas at lower end 24 of housing 12 and one or more antennas at upper end 22 of housing 12. Locating antennas at opposing ends of device 10 (i.e., at the narrower end regions of display 14 and device 10 when device 10 has an elongated rectangular shape of the type shown in FIG. 1) may allow these antennas to be formed at an appropriate distance from ground structures that are associated with the conductive portions of display 14 (e.g., the pixel array and driver circuits in active region 20A of display 14).

If desired, a first cellular telephone antenna may be located in region 24 and a second cellular telephone antenna may be located in region 22. Antenna structures for handling satellite navigation signals such as Global Positioning System signals or wireless local area network signals such as IEEE 802.11 (WiFi®) signals or Bluetooth® signals may also be provided in regions 22 and/or 24 (either as separate additional antennas or as parts of the first and second cellular telephone antennas). Antenna structures may also be provided in regions 22 and/or 24 to handle WiMax (IEEE 802.16) signals.

In regions 22 and 24, openings may be formed between conductive housing structures and printed circuit boards and other conductive electrical components that make up device 10. These openings may be filled with air, plastic, or other dielectrics. Conductive housing structures and other conductive structures may serve as a ground plane for the antennas in device 10. The openings in regions 22 and 24 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element such as an inverted-F antenna resonating element formed from part of a conductive peripheral housing structure in device 10 from the ground plane, or may otherwise serve as part of antenna structures formed in regions 22 and 24.

Antennas may be formed in regions 22 and 24 that are identical (i.e., antennas may be formed in regions 22 and 24 that each cover the same set of cellular telephone bands or other communications bands of interest). Due to layout constraints or other design constraints, it may not be desirable to use identical antennas. Rather, it may be desirable to implement the antennas in regions 22 and 24 using different designs. For example, the first antenna in region 24 may cover all cellular telephone bands of interest (e.g., four or five bands) and the second antenna in region 22 may cover a subset of the four or five bands handled by the first antenna. Arrangements in which the antenna in region 24 handles a subset of the bands handled by the antenna in region 22 (or vice versa) may also be used. Tuning circuitry may be used to tune this type of antenna in real time to cover a either a first subset of bands or a second subset of bands and thereby cover all bands of interest.

To reliably receive incoming voice or data calls, device 10 should be able to receive incoming paging signals. In some situations, incoming paging signals are weak due to interference or a relatively large distance between device 10 and the transmitting cellular telephone tower. In situations such as these, multiple antennas (e.g., both antennas in a dual antenna system) may be used in receiving paging signals. In particular, radio-frequency transceiver circuitry 60 may simultaneously use receivers 61 and 65 to receive incoming signals. These signals may be combined by transceiver circuitry 60 before demodulation using baseband processor 58. Combining received signals from multiple antennas in this way can improve received signal quality and can therefore help ensure that incoming pages are received properly, even in areas with weak signals. Use of dual antennas in receiving signals generally consumes more power than use of a single antenna in receiving signals. Device 10 may therefore revert to using only a single antenna whenever signal conditions improve.

An antenna switching algorithm that runs on the circuitry of device 10 can be used to automatically change between antenna modes in real time based on the evaluated signal quality of received signals. The antenna switching algorithm may direct device 10 to operate in a multiple antenna mode (e.g., a dual antenna mode) when incoming signals are weak and may direct device 10 to operate in a single antenna mode when incoming signals are strong (as an example). With this type of arrangement, it is not necessary to simultaneously use multiple antennas and associated receiver circuits for monitoring incoming paging signals except when paging signals are of poor quality, thereby minimizing power consumption.

Arrangements in which device 10 has a primary antenna (e.g., an antenna that typically exhibits superior performance) and a secondary antenna (e.g., an antenna whose performance typically does not exceed that of the primary antenna) are sometimes described herein as an example. This is, however, merely illustrative. Device 10 may use three or more antennas if desired. Device 10 may use antennas that are substantially identical (e.g., in band coverage, in efficiency, etc.), or may use other types of antenna configurations.

When operating in single antenna mode, either the primary or the secondary antenna may be used. For example, device 10 may default to use of the primary antenna whenever changing to single antenna mode from dual antenna mode while monitoring paging signals. If desired, device 10 may select an optimum antenna to use when transitioning from dual antenna mode to single antenna mode. Device 10 may select the optimum antenna by evaluating the signal strength on each antenna and choosing the antenna with the strongest signal or by using other suitable antenna selection criteria.

Figure 2:
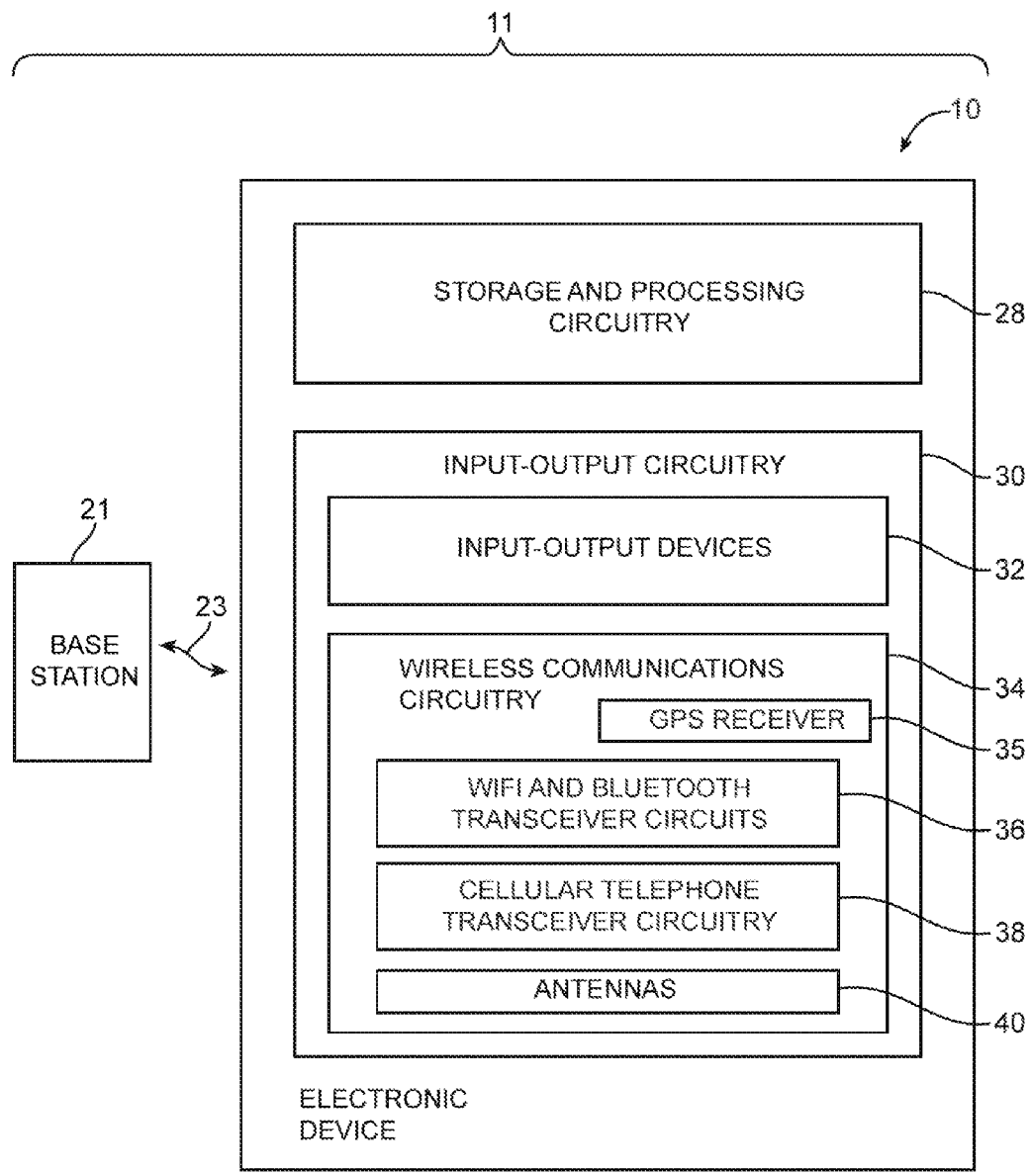
FIG. 2 is a schematic diagram of a wireless network including a base station and an illustrative electronic device with wireless communications circuitry having multiple antennas in accordance with an embodiment of the present invention.

A schematic diagram of a system in which electronic device 10 may operate is shown in FIG. 2. As shown in FIG. 2, system 11 may include wireless network equipment such as base station 21. Base stations such as base station 21 may be associated with a cellular telephone network or other wireless networking equipment. Device 10 may communicate with base station 21 over wireless link 23 (e.g., a cellular telephone link or other wireless communications link).

Device 10 may include control circuitry such as storage and processing circuitry 28. Storage and processing circuitry 28 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in storage and processing circuitry 28 and other control circuits such as control circuits in wireless communications circuitry 34 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment such as base station 21, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE802.16 (WiMax) protocols, cellular telephone protocols such as the Long Term Evolution (LTE) protocol, Global System for Mobile Communications (GSM) protocol, Code Division Multiple Access (CDMA) protocol, and Universal Mobile Telecommunications System (UMTS) protocol, etc.

Circuitry 28 may be configured to implement control algorithms that control the use of antennas in device 10. For example, circuitry 28 may configure wireless circuitry 34 to switch a particular antenna into use for transmitting and/or receiving signals or may switch multiple antennas into use simultaneously. In some scenarios, circuitry 28 may be used in gathering sensor signals and signals that reflect the quality of received signals (e.g., received paging signals, received voice call traffic, received control channel signals, received data traffic, etc.). Examples of signal quality measurements that may be made in device 10 include bit error rate measurements, signal-to-noise ratio measurements, measurements on the amount of power associated with incoming wireless signals, channel quality measurements based on received signal strength indicator (RSSI) information (RSSI measurements), channel quality measurements based on received signal code power (RSCP) information (RSCP measurements), channel quality measurements based on signal-to-interference ratio (SINR) and signal-to-noise ratio (SNR) information (SINR and SNR measurements), channel quality measurements based on signal quality data such as Ec/Io or Ec/No data (Ec/Io and Ec/No measurements), etc. This information may be used in controlling which antenna mode is used (e.g., single antenna mode or dual antenna mode) and may be used in selecting an optimum antenna in single antenna mode (if desired). Antenna selections can also be made based on other criteria.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals.

Wireless communications circuitry 34 may include satellite navigation system receiver circuitry such as Global Positioning System (GPS) receiver circuitry 35 (e.g., for receiving satellite positioning signals at 1575 MHz). Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as bands at 700 MHz, 850 MHz, 900 MHz, 1800 MHz, 1900 MHz, and 2100 MHz or other cellular telephone bands of interest. Wireless communications circuitry 34 can include circuitry for other short-range and long-range wireless links if desired (e.g., WiMax circuitry, etc.). Wireless communications circuitry 34 may, for example, include, wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable types of antenna. For example, antennas 40 may include antennas with resonating elements that are formed from loop antenna structures, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link antenna. As described in connection with FIG. 1, there may be multiple cellular telephone antennas in device 10. For example, there may be one cellular telephone antenna in region 24 of device 10 and another cellular telephone antenna in region 22 of device 10. These antennas may be fixed or may be tunable.

Figure 3:
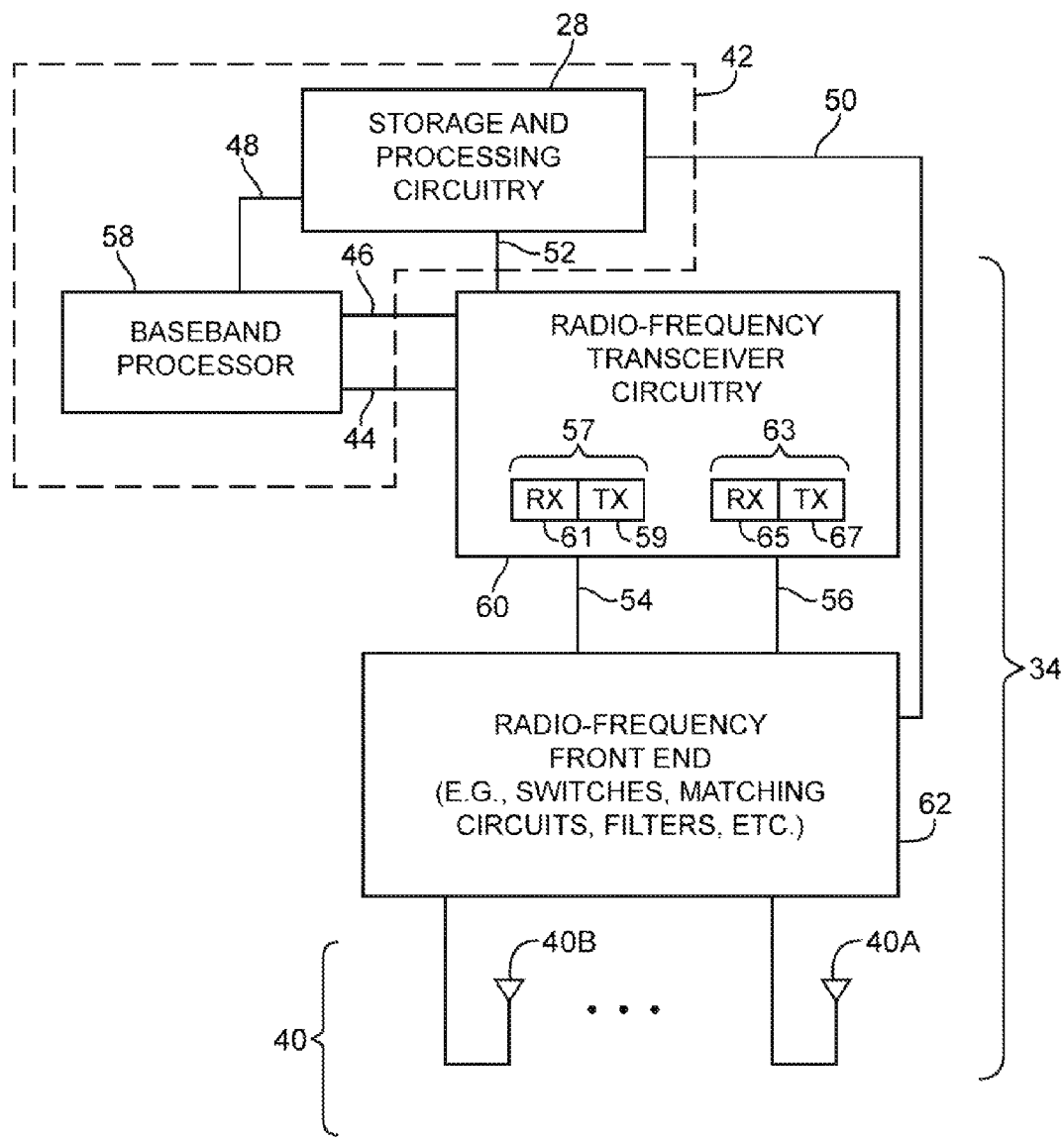
FIG. 3 is a diagram of illustrative wireless circuitry including multiple antennas and circuitry for controlling use of the antennas in accordance with an embodiment of the present invention.

Device 10 can be controlled by control circuitry that is configured to store and execute control code for implementing control algorithms (e.g., antenna diversity control algorithms and other wireless control algorithms). As shown in FIG. 3, control circuitry 42 may include storage and processing circuitry 28 (e.g., a microprocessor, memory circuits, etc.) and may include baseband processor 58. Baseband processor 58 may form part of wireless circuitry 34 and may include memory and processing circuits (i.e., baseband processor 58 may be considered to form part of the storage and processing circuitry of device 10).

Baseband processor 58 may provide data to storage and processing circuitry 28 via path 48. The data on path 48 may include raw and processed data associated with wireless (antenna) performance metrics for received signals such as received power, transmitted power, frame error rate, bit error rate, channel quality measurements based on received signal strength indicator (RSSI) information, channel quality measurements based on received signal code power (RSCP) information, channel quality measurements based on signal-to-interference ratio (SINR) and signal-to-noise ratio (SNR) information, channel quality measurements based on signal quality data such as Ec/Io or Ec/No data, information on whether responses (acknowledgements) are being received from a cellular telephone tower corresponding to requests from the electronic device, information on whether a network access procedure has succeeded, information on how many re-transmissions are being requested over a cellular link between the electronic device and a cellular tower, information on whether a loss of signaling message has been received, information on whether paging signals have been successfully received, and other information that is reflective of the performance of wireless circuitry 34. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers such as transceivers 57 and 63 (e.g., one or more transceivers that are shared among antennas, one transceiver per antenna, etc.). In the illustrative configuration of FIG. 3, radio-frequency transceiver circuitry 60 has a first transceiver such as transceiver 57 that is associated with path (port) 54 (and which may be associated with path 44) and a second transceiver such as transceiver 63 that is associated with path (port) 56 (and which may be associated with path 46). Transceiver 57 may include a transmitter such as transmitter 59 and a receiver such as receiver 61 or may contain only a receiver (e.g., receiver 61) or only a transmitter (e.g., transmitter 59). Transceiver 63 may include a transmitter such as transmitter 67 and a receiver such as receiver 65 or may contain only a receiver (e.g., receiver 65) or only a transmitter (e.g., transmitter 59).

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by transmitters 59 and 67 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60 such as receiver 61 at port 54 and receiver 63 at port 56, and paths such as paths 44 and 46. Baseband processor 58 may convert these received signals into digital data that is provided to storage and processing circuitry 28. Baseband processor 58 may also extract information from received signals that is indicative of signal quality for the channel to which the transceiver is currently tuned. For example, baseband processor and/or other circuitry in control circuitry 42 may analyze received signals to produce bit error rate measurements, measurements on the amount of power associated with incoming wireless signals, strength indicator (RSSI) information, received signal code power (RSCP) information, signal-to-interference ratio (SINR) information, signal-to-noise ratio (SNR) information, channel quality measurements based on signal quality data such as Ec/Io or Ec/No data, etc. This information may be used in controlling which antenna(s) to use in device 10. For example, a control algorithm running on control circuitry 42 may be used to place device 10 into a dual antenna mode in which both antennas are operating or a single antenna mode in which a single antenna is operating based on channel quality measurements such as these and other information. The control algorithm may also use channel quality measurements to select which antenna to use during single antenna mode operations.

Radio-frequency front end 62 may include a switch that is used to connect transceiver 57 to antenna 40B and transceiver 63 to antenna 40A or vice versa. The switch may be configured by control signals received from control circuitry 42 over path 50. Circuitry 42 may, for example, adjust the switch to select which antenna is being used to transmit radio-frequency signals (e.g., when it is desired to share a single transmitter in transceiver 60 between two antennas) or which antenna is being used to receive radio-frequency signals (e.g., when it is desired to share a single receiver between two antennas).

If desired, antenna selection may be made by selectively activating and deactivating transceivers without using a switch in front end 62. For example, if it is desired to use antenna 40B but not antenna 40A, transceiver 57 (which may be coupled to antenna 40B through circuitry 62) may be activated and transceiver 63 (which may be coupled to antenna 40A through circuitry 62) may be deactivated. If it is desired to use antenna 40A but not antenna 40B, circuitry 42 may activate transceiver 63 and deactivate transceiver 57. Combinations of these approaches may also be used to select which antennas are being used to transmit and/or receive signals. When it is desired to receive incoming signals such as paging signals using both antennas, transceiver 57 and transceiver 63 may be simultaneously activated to place device 10 in a dual antenna mode.

Control operations such as operations associated with configuring wireless circuitry 34 to transmit or receive radio-frequency signals through desired antennas 40 may be performed using a control algorithm that is implemented on control circuitry 42 (e.g., using the control circuitry and memory resources of storage and processing circuitry 28 and baseband processor 58).

There is typically a paging channel associated with each communications band in network 11 (FIG. 2). When an incoming call is being made to device 10 (sometimes referred to as a mobile station), network 11 may send a paging signal on the paging channel to device 10 from base station 21. The transmission of the paging signal alerts device 10 to the presence of the incoming call and directs device 10 to establish a wireless communications link with base station 21 (i.e., link 23 of FIG. 2) for handling the traffic associated with the call.

To conserve battery power, device 10 may be operated in a low-power idle mode when not in active use for a telephone call. In idle mode, wireless circuitry 34 of device 10 may alternate between sleep and wake states. While operating in the sleep state, device 10 may inactivate wireless circuitry such as radio-frequency transceiver circuitry 60 so that device 10 consumes a reduced amount of power. The sleep state may last for a sleep period of about 640 ms to 5.1 s or other suitable duration. When the sleep period is over, wireless circuitry 34 wakes up from the sleep state. The duration of the wake period may be about 100 ms (as an example). During the wake period, radio-frequency transceiver circuitry 60 is active, so that wireless circuitry 34 can listen for incoming cellular telephone calls by monitoring a paging channel.

If, upon awakening, device 10 is out of service, the device 10 may initiate a system search process to search for an available wireless network. If device 10 is in service, but does not receive any paging signals during the wake period, device 10 may return to the sleep state. If device 10 detects incoming paging signals during the wake period, device 10 can proceed with call setup operations to set up communications link 23 with base station 21 and receive an incoming telephone call or other data from the network.

Because device 10 has multiple antennas 40, device 10 may, if desired, simultaneously use multiple antennas in listening for paging signals during each wake period. Power consumption can be minimized by using fewer than all of the available antennas in device 10 when appropriate during these listening operations. For example, if device 10 has two antennas, power consumption can be minimized by using only one of the two antennas to monitor the paging channel for incoming paging signals during any given wake period, provided that signal strength is sufficient. Transceiver circuitry associated with the unused antenna can be deactivated. If signal strength is poor, however, device 10 can be placed in a multi-antenna mode (e.g., a dual antenna mode) and can simultaneously use multiple antennas 40 to receive paging signals, thereby ensuring that incoming calls are not missed. Device 10 can also default to using multiple antennas 40 to receive paging signals in situations in which paging signals have not been recently successfully received.

Figure 4:
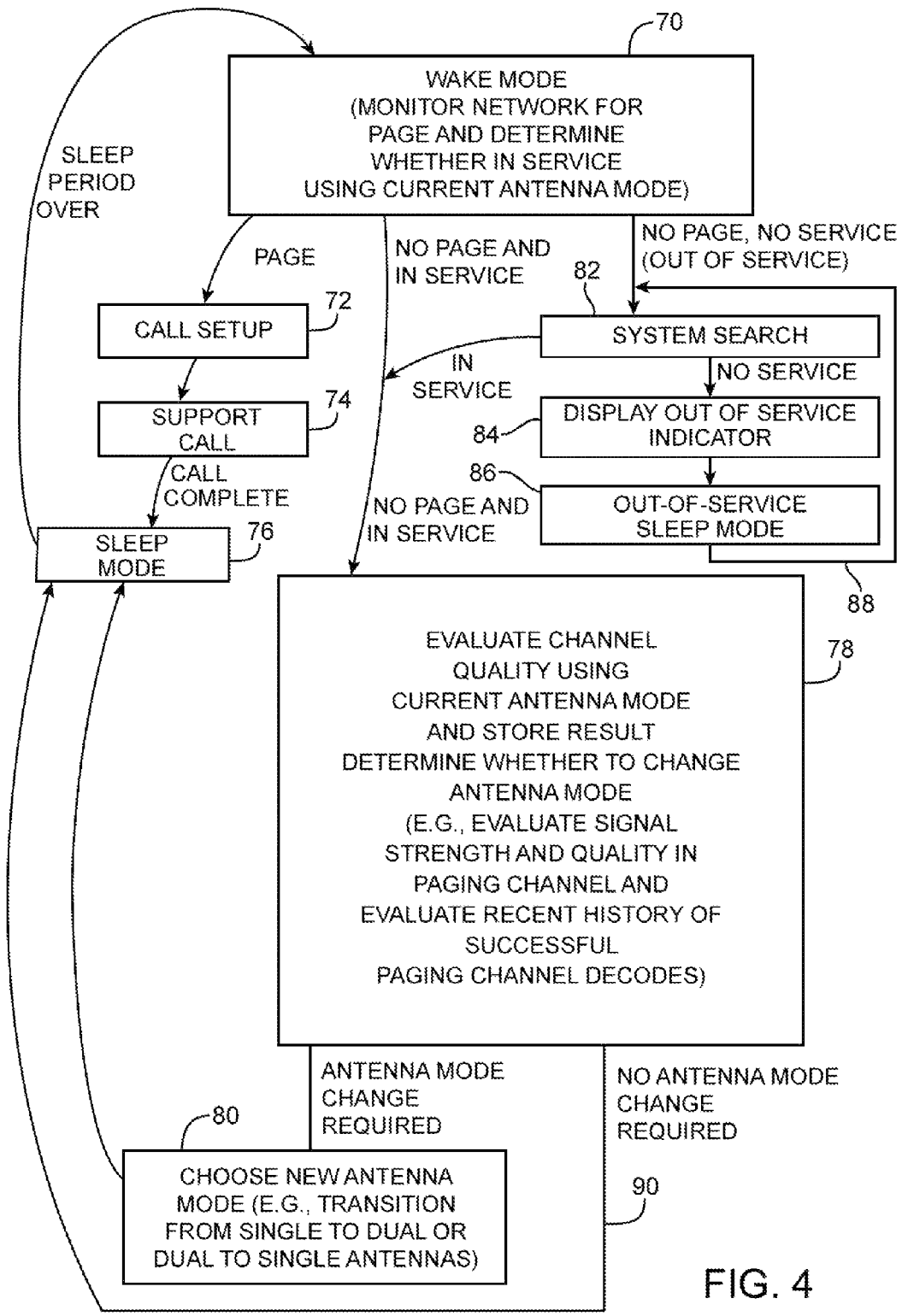
FIG. 4 is a flow chart of illustrative operations involved in using an electronic device with multiple antennas to monitor a paging channel for incoming paging signals in accordance with an embodiment of the present invention.

Device 10 may use an idle mode antenna selection algorithm that intelligently determines in real time whether to place device 10 in dual antenna mode (or other multi-antenna mode) or single antenna mode. FIG. 4 is a flow chart of illustrative steps involved in using an idle mode antenna selection algorithm running on control circuitry 42 of device 10 to intelligently select which antenna mode is to be used in monitoring a paging channel for paging signals.

When not actively handling a call, wireless circuitry 34 may be operated in a sleep mode (step 76). In the sleep mode, unneeded wireless circuits such as radio-frequency transceiver circuitry 60 may be temporarily inactivated (e.g., fully or partly powered down) to reduce power consumption. A timer in control circuitry 42 may be used to measure the amount of time that device 10 remains in the sleep mode (sometimes referred to as the sleep period). The length of the sleep period may be, for example, 640 ms to 5.1 s (as an example).

Following expiration of the sleep period, wireless circuitry 34 may be awoken and operated in wake mode (step 70). For example, radio-frequency transceiver 60 may be activated and tuned to a paging channel in network 11. Radio-frequency front-end circuitry 62 and radio-frequency transceiver circuitry 60 may be adjusted so that one or more antennas 40 are used in receiving signals on the paging channel. Device 10 may, for example, support a single antenna mode in which one of antennas 40 is used in receiving paging signals and a dual antenna mode in which two antennas 40 are used in receiving paging signals. Antenna modes that involve use of three or more antennas may also be supported if desired. The use of a single-antenna/dual-antenna configuration for device 10 is sometimes described herein as an example.

If device 10 is currently operating in a single antenna mode, a default antenna (i.e., a primary antenna such as the lower antenna in region 24 of FIG. 1) or an optimum antenna (i.e., a single antenna selected based on signal strength criteria or other suitable antenna selection criteria) may be used in monitoring incoming paging signals. In a device configuration in which radio-frequency transceiver circuitry 60 includes a first receiver such as receiver 61 and a second receiver such as receiver 65, control signals on path 52 may be used to activate a given one of these two receivers while deactivating the other, as appropriate. The antenna that is coupled to the active receiver (e.g., antenna 40A) will therefore be used in monitoring the paging channel for paging signals whereas the antenna that is coupled to the inactive receiver (e.g., antenna 40B) will not be used. In addition to monitoring the paging channel, wireless circuitry 34 may use the current antenna in determining whether signal traffic is present that indicates that device 10 is in service.

If device 10 is currently operating in a dual antenna mode (or other multi-antenna mode), multiple antennas 40 (e.g., both a lower antenna in region 24 and an upper antenna in region 22) may be simultaneously used in monitoring incoming paging signals. In a device configuration in which radio-frequency transceiver circuitry 60 includes a first receiver such as receiver 61 and a second receiver such as receiver 65, control signals on path 52 may be used to simultaneously activate both of these two receivers. The paging signal input received by radio-frequency transceiver circuitry 60 in the dual antenna mode may include signal information from both antennas 40A and 40B and may therefore be superior to signal information gathered using only a single antenna. The superior signal quality that results from using both antennas simultaneously enhances the ability of baseband processor 58 to successfully demodulate and process the incoming signals to determine if device 10 has an incoming page.

If a paging signal is detected on the paging channel, device 10 can perform call setup operations (step 72) by wirelessly interacting with base station 21 to set up wireless communications link 23. Link 23 may then be used to carry traffic associated with a cellular telephone call (step 74). During a telephone call, device 10 may use wireless circuitry 34 to transmit outgoing call traffic to base station 21 over link 23 and base station 21 can transmit incoming call traffic to wireless circuitry 34 over link 23.

Once the call is complete, device 10 can place wireless circuitry 34 in sleep mode 76. In particular, device 10 can inactivate wireless circuitry such as radio-frequency transceiver circuitry 60 (FIG. 3). Control circuitry 42 may maintain wireless circuitry 34 in the sleep mode for a sleep period of 640 ms to 5.1 s or other suitable time period. Once the sleep period has expired, device 10 can awaken wireless circuitry 34 (e.g., by activating radio-frequency transceiver circuitry 60) for a wake period (e.g., a wake period of 100 ms or other suitable duration).

While in wake mode, device 10 can use radio-frequency transceiver circuitry 60 and the currently active antenna (if device 10 is in single antenna mode) or antennas (if device 10 is in dual antenna mode) to monitor the paging channel for incoming paging signals and can monitor network 11 for incoming wireless network signals indicating that device 10 is in service.

In response to determining that device 10 is in service and is receiving a paging signal, device 10 can perform call setup operations (step 72), can be used to support a voice call (step 74), and can return to sleep mode 76 following completion of the voice call.

In response to determining that device 10 is not receiving a paging signal and is not in service, device 10 can search for an available wireless network (step 82). When performing wireless network searching during step 82, device 10 is sometimes referred to as performing a "system search" in the context of networks such as CDMA networks and is sometimes referred to as performing a "public land mobile network search" in the context of networks such as UMTS networks).

If the search for an available wireless network that is performed during the operations of step 82 does not reveal any available networks, device 10 is out of service and may display an out-of-service indicator on display 14 (step 84). Device 10 may then, at step 86, enter a deep sleep mode (sometimes referred to as out-of-service sleep) in which unneeded wireless circuitry 34 (e.g., transceiver circuitry 60) is inactivated. The out-of-service sleep period may be different than the sleep period used for sleep mode 76 (e.g., the out-of-service sleep period may be longer and/or may involve deactivating more circuitry).

Periodically, device 10 can awaken circuitry 34 from out-of-service sleep mode 86 and can perform a new system search, as indicated by line 88.

When the system search of step 82 is successful and an available wireless network has been located, device 10 is in service. In response to detection of an available network during the operations of step 82 or when the wake period monitoring operations of step 70 reveal that device 10 is not receiving any paging signals and is in service, device operations may proceed to step 78.

At step 78, device 10 can evaluate the quality of incoming signals. In particular, device 10 may use control circuitry 42 (e.g., baseband processor 58) to evaluate the quality γ of the incoming paging signal on the paging channel or other incoming signals that are being received by device 10. These signal quality measurements (i.e., the value of γ), which may sometimes be referred to as channel quality measurements, measured signal quality, or antenna performance parameters, may include bit error rate measurements, measurements on the amount of power associated with incoming wireless signals, strength indicator (RSSI) information, received signal code power (RSCP) information, signal-to-interference ratio (SINR) information, signal-to-noise ratio (SNR) information, channel quality measurements based on signal quality data such as Ec/Io or Ec/No data, or other suitable performance metrics that are indicative of the performance of device 10 in receiving wireless signals with its currently selected antenna or antennas.

In addition to using wireless performance metrics such as these, device 10 may evaluate the recent history of device 10 in receiving paging signals. For example, device 10 may maintain information on when device 10 has successfully received paging signals. If device 10 has not decoded any successful pages for a given number of sleep-wake cycles (e.g., 3-10 sleep-wake cycles or other suitable predetermined number of sleep-wake cycles), device 10 can automatically switch to the dual antenna mode, even if signal strength criteria would otherwise recommend use of the single antenna mode.

With one illustrative configuration, the incoming signal quality evaluation operations of step 78 may use parameters (e.g., signal quality measurements) such as pilot channel signal strength, total received signal strength, and pilot channel quality (i.e., the ratio of pilot channel strength to total signal strength). In UMTS protocols (wideband CDMA protocols) and CDMA protocols (e.g., CDMA 2000), pilot channel signal strength is represented by the parameter RSCP, pilot channel quality is represented by parameter RSSI, and pilot quality is represented by Ec/Io. Other protocols (e.g., GSM, LTE) have similar parameters (e.g., Rx level, Rx quality, Reference Signal Received Power, Reference Signal Received Quality, etc.). The decision of whether or not to place device 10 into dual antenna mode can be made by comparing each of these signal parameters to associated thresholds and by combining the results of these comparisons using logical operators (e.g., OR operators and/or AND operators). As an example, the expression of equation 1 may be evaluated by storage and processing circuitry 28 based on information from baseband processor 58 (where T1, T2, and T3 are thresholds having values selected to produce a satisfactory balance between good paging signal reception and power conservation):

$$RSCP < T1 \text{ OR } RSSI < T2 \text{ OR } Ec/Io < T3 \qquad (1)$$

When expression 1 is true (i.e., when any of the listed signal quality parameters is lower than a predetermined threshold, thereby indicating poor paging signal strength and indicating that antenna performance and received signal quality for the current antenna mode is unsatisfactory), storage and processing circuitry 28 may conclude that device 10 should be operated in dual antenna mode (e.g., by switching from single antenna mode to dual antenna mode or maintaining current use of the dual antenna mode). When expression 1 is false (i.e., when all of the antenna performance parameters exceed their respective thresholds indicating that antenna performance and received signal quality for the current antenna mode is satisfactory), storage and processing circuitry 28 can conclude that device 10 should be operated in single antenna mode (e.g., by switching from dual antenna mode to single antenna mode or by maintaining device 10 in the single antenna mode).

If desired, AND operators or other logical operators (e.g., Boolean operators, etc.) may be used between the terms of the expression of equation 1 in addition to or instead of using logical OR operators. The example of expression 1 is merely illustrative. Moreover, additional criteria may be applied by storage and processing circuitry 28, such as criteria based on the recent history of device 10 in successfully receiving pages. As an example, device 10 can determine that the antenna mode should switch from single to dual whenever device 10 has failed to successfully decode pages on the paging channel for more than a predetermined number of sleep-wake cycles (cycles through steps 76 and 70), because failure to successfully receive pages may be indicative of a potential difficulty in receiving pages even if signal strength metrics such as RSCP, RSSI, and EC/Io appear to otherwise indicate that signal quality is acceptable. With this type of arrangement, storage and processing circuitry 28 can decide to override a single antenna mode decision that is made using expression 1.

Using expressions such as expression 1 and an optional override function based on successful paging decode history information, channel quality can be evaluated during the operations of step 78 so that device 10 can determine whether or not to change the current antenna mode. If device 10 is currently operating in single antenna mode and the channel evaluation operations of step 78 indicate that the channel is not significantly impaired, device 10 can remain in single antenna mode. If device 10 is currently operating in dual antenna mode and the evaluation operations of step 78 indicate that the channel is still impaired (i.e., because one or more of the signal quality parameters is lower than its predetermined threshold or because device 10 has a recent history of not receiving paging signals), device 10 can remain in dual antenna mode. When no antenna mode change is required, device 10 may enter sleep mode 76 as indicated by line 90.

If device 10 is currently operating in dual antenna mode and storage and processing circuitry 28 determines from the channel evaluation operations of step 78 that channel quality is no longer impaired, storage and processing circuitry 28 may place device 10 into the single antenna mode at step 80. If device 10 is currently operating in single antenna mode and the channel evaluation operations of step 78 indicate that channel quality has become impaired, storage and processing circuitry 28 can place device 10 into the dual antenna mode at step 80. Following the operations of step 80, device 10 may be placed in sleep mode 76.

There is generally an increase in power consumption associated with operating device 10 in dual antenna mode rather than single antenna mode. Accordingly, battery power can be conserved by limiting use of the dual antenna mode to situations in which device 10 is having difficulties receiving a clean paging signal or is otherwise exhibiting difficulty in adequately monitoring the paging channel.

During the operations of the flow chart of FIG. 4, device 10 may use control circuitry 42 to run a control algorithm that determines in real time whether or not to switch the antenna mode for device 10. In particular, the control algorithm may, during the evaluation operations of step 78, determine whether or not a single or dual antenna mode of operation should be retained or whether the current antenna mode should be changed.

In performing the operations of step 78, device 10 may use signal quality measurements that were obtained during step 70 (i.e., signal quality measurements for the current sleep-wake cycle that have been obtained using the currently active antenna or antennas). Device 10 may also use signal quality measurements that were obtained during earlier wake periods (i.e., measurements from step 70 in one or more of the previous sleep-wake cycles that have been retained in storage). The antenna mode that was used in making signal quality measurements during the previous sleep-wake cycle (sometimes referred to as the previous antenna mode) may or may not be the same antenna mode that is currently being used (i.e., the previous antenna mode may or may not be the same as the current antenna mode).

Antennas 40 may or may not all be identical. If desired, operation with one antenna may be generally preferred over another when operating in single antenna mode. For example, one antenna (sometimes referred to as the primary antenna) may be located in a portion of device 10 such as region 24 where the antenna is typically located farther from external objects such as the human body and may be constructed with a more efficient design that an antenna located in another portions of device 10 such as region 22. With this type of arrangement, the antenna other than the primary antenna (i.e., the alternate antenna) may sometimes be referred to as the secondary antenna. In device 10, for example, antenna 40A may be the primary antenna and antenna 40B may be the secondary antenna or vice versa.

During the operations of step 78, device 10 may evaluate whether or not to swap antenna modes. Device 10 can also determine when using the single antenna mode whether or not to maintain the current primary and secondary antenna assignments or whether or not to swap these assignments. Signal quality measurements, threshold values, and other information may be used in determining whether or not to switch the primary and secondary antennas when operating in single antenna mode. Device 10 can reevaluate whether the primary or secondary antenna is performing better each time the antenna mode is switched to the single antenna mode or may revert to using the primary antenna as a default each time device 10 changes from dual antenna mode to single antenna mode (as examples).

If desired, the criteria used in determining whether or not to switch antenna modes may be different depending on whether the current antenna mode is the single antenna mode or the dual antenna mode. For example, device 10 may be predisposed to switch into dual channel mode and to remain there if it is desired to minimize missed paged signals. If it is desired to minimize power consumption (at the expense of a somewhat increased risk of missed pages), device 10 may be predisposed to switch into single antenna mode from dual channel mode and may be predisposed to remain in single antenna mode.

The foregoing is merely illustrative of the principles of this invention and various modifications can be made by those skilled in the art without departing from the scope and spirit of the invention.

What is claimed is:

1. A method for using an electronic device that has at least first and second antennas to monitor a wireless network for incoming paging signals, wherein the electronic device is operable in a single antenna mode in which only a single selected one of the first and second antennas is used in receiving incoming signals and a dual antenna mode in which both of the first and second antennas are simultaneously used, the method comprising:

monitoring a paging channel for incoming paging signals while operating the electronic device in a current antenna mode selected from the single antenna mode and the dual antenna mode; and evaluating signal quality measurements using storage and processing circuitry in the electronic device to determine whether to change the current antenna mode for receiving subsequent incoming paging signals, wherein evaluating whether to switch the current antenna mode comprises evaluating an expression that includes a pilot channel signal strength, a total received signal strength, and a ratio of pilot channel strength to total signal strength, and wherein evaluating the expression comprises determining whether any of the pilot channel signal strength, the total received signal strength, and the ratio of pilot channel strength to total signal strength has exceeded a corresponding threshold.

2. The method defined in claim 1 wherein the current antenna mode comprises the single antenna mode and wherein evaluating the signal quality measurements comprises determining that the signal quality measurements are unsatisfactory so that the current antenna mode should be changed to the dual antenna mode for receiving the subsequent incoming paging signals.

3. The method defined in claim 2 further comprising:
in response to determining that the current antenna mode should be changed to the dual antenna mode, changing the antenna mode from the single antenna mode to the dual channel mode.

4. The method defined in claim 1 wherein the current antenna mode comprises the dual antenna mode and wherein evaluating the signal quality measurements comprises determining that the signal quality measurements are satisfactory so that the current antenna mode should be changed to the single antenna mode for receiving subsequent incoming paging signals.

5. The method defined in claim 4 further comprising:
in response to determining that the current antenna mode should be changed to the single antenna mode, changing the antenna mode from the dual antenna mode to the single channel mode.

6. The method defined in claim 1 wherein evaluating whether to switch the current antenna mode comprises evaluating signal quality measurements selected from the group consisting of: bit error rate measurements, signal-to-noise ratio measurements, signal-to-interference ratio measurements, signal-to-noise ratio measurements, Ec/Io measurements, and Ec/No measurements.

7. The method defined in claim 1 wherein evaluating whether to switch the current antenna mode comprises evaluating history information on successfully received pages.

8. An electronic device configured to communicate with a wireless network, comprising:
at least first and second antennas;
radio-frequency transceiver circuitry coupled to the first and second antennas; and
control circuitry configured to direct the radio-frequency transceiver circuitry to alternately operate in a sleep mode and a wake mode, wherein the radio-frequency transceiver circuitry does not monitor the wireless network for paging signals during the sleep mode, wherein the radio-frequency transceiver circuitry monitors the wireless network for paging signals during the wake mode using a single antenna mode in which only a single one of the first and second antennas is active and a dual antenna mode in which at least both the first and second antenna are active, wherein the control circuitry is configured to make signal quality measurements on received signals, wherein the control circuitry is configured to choose whether the single antenna mode or the dual antenna mode is used to monitor the wireless network for paging signals during a subsequent wake mode based at least partly on the signal quality measurements, and wherein the control circuitry is configured to choose whether the single mode or the dual antenna mode is used based at least partly on history information on successfully received pages.

9. The electronic device defined in claim 8 wherein the electronic device has a rectangular housing with opposing ends, wherein the first antenna is located at a first of the ends, and wherein the second antenna is located at a second of the ends.

10. The electronic device defined in claim 8 wherein the control circuitry is configured to choose whether the single antenna mode or the dual antenna mode is used based on at least one signal quality measurement selected from the group consisting of: pilot channel signal strength, total received signal strength, and a ratio of pilot channel strength to total signal strength.

11. The electronic device defined in claim 8 further comprising a radio-frequency front end with which the radio-frequency transceiver circuitry is coupled to the first and second antennas, wherein the control circuitry includes a baseband processor and includes storage and processing circuitry that receives the signal quality measurements from the baseband processor, wherein the storage and processing circuitry is configured to issue control commands to the radio-frequency transceiver circuitry and radio-frequency front end in response to the signal quality measurements.

12. A method for monitoring a paging channel for paging signals with an electronic device, comprising:
operating the electronic device in alternating sleep and wake modes;
during wake mode operations, monitoring the paging channel for incoming paging signals using either a single antenna mode in which only a single antenna in the electronic device receives the incoming paging signals or a dual antenna mode in which at least two antennas in the electronic device simultaneously receive the incoming paging signals; and
with control circuitry in the electronic device, choosing between use of the single antenna mode and the dual antenna mode based on received signal quality information, wherein choosing between use of the single antenna mode and the dual antenna mode comprises choosing between the single antenna mode and the dual antenna mode by evaluating history information on successfully received pages.

13. The method defined in claim 12 wherein the received signal quality information includes at least one signal quality measurement selected from the group consisting of: pilot channel signal strength, total received signal strength, and a ratio of pilot channel strength to total signal strength and wherein choosing between use of the single antenna mode and the dual antenna mode based on the received signal quality information comprises choosing between use of the single antenna mode and the dual antenna mode based on the at least one signal quality measurement selected from the group consisting of: pilot channel signal strength, total received signal strength, and a ratio of pilot channel strength to total signal strength.

14. The method defined in claim 12 wherein choosing between use of the single antenna mode and the dual antenna mode comprises choosing between the single antenna mode and the dual antenna mode based on signal quality measurements selected from the group consisting of: bit error rate measurements, signal-to-noise ratio measurements, received power measurements, signal strength indicator measurements, received signal code power measurements, signal-to-interference ratio measurements, signal-to-noise ratio measurements, Ec/Io measurements, and Ec/No measurements.

* * * * *